United States Patent [19]

Hansen et al.

[11] Patent Number: 4,635,413
[45] Date of Patent: Jan. 13, 1987

[54] STRUCTURAL CONNECTORS AND/OR STRUCTURES

[75] Inventors: Peder U. Hansen, Auckland, New Zealand; Mark D. Beazley, Nerang, Australia

[73] Assignee: Hong Sheet Metal Pte. Limited, Collyer Quay, Singapore

[21] Appl. No.: 784,386

[22] Filed: Oct. 4, 1985

[30] Foreign Application Priority Data

Oct. 11, 1984 [AU] Australia .................... PG7590

[51] Int. Cl.$^4$ .......... E04B 7/04; E04B 7/16; E04C 1/10
[52] U.S. Cl. .......................................... 52/92; 52/94; 52/262; 52/263; 52/282; 52/283; 52/580; 52/641; 52/657; 52/785; 403/402; 403/403
[58] Field of Search ............... 52/580, 282, 92, 94, 52/641, 657, 309.11, 403, 785, 283, 274, 262, 263, 281; 403/402, 403

[56] References Cited

U.S. PATENT DOCUMENTS

| | | | |
|---|---|---|---|
| 1,787,167 | 12/1930 | Purdy | 52/92 X |
| 1,832,078 | 11/1931 | Zahner et al. | 403/402 X |
| 1,893,636 | 1/1933 | Ridgway | 52/282 X |
| 3,243,929 | 4/1966 | Strandlund et al. | 52/282 X |
| 3,251,163 | 5/1966 | Russell | 52/282 |
| 3,529,393 | 9/1970 | Wilkins | 52/282 X |
| 3,939,618 | 2/1976 | Murphy | 52/274 |
| 4,090,339 | 5/1978 | Anderson | 52/580 |
| 4,433,514 | 2/1984 | Henges, Jr. et al. | 52/94 |

FOREIGN PATENT DOCUMENTS

| | | | |
|---|---|---|---|
| 634498 | 1/1962 | Canada | 52/580 |
| 889045 | 12/1972 | Canada | 52/403 |
| 2103502 | 12/1972 | Fed. Rep. of Germany | 52/282 |
| 355939 | 11/1905 | France | 52/92 |
| 509696 | 9/1976 | U.S.S.R. | 52/404 |

Primary Examiner—Alfred C. Perham
Attorney, Agent, or Firm—Holman & Stern

[57] ABSTRACT

A panel comprising a perimeter frame, a pair of skins spaced apart by the perimeter frame, and load distributing connecting members at the corners of the frame. The perimeter frame is formed from members having two oppositely directed channels so that when a pair of panels are positioned in a side by side relationship one channel of the perimeter frame of one panel will enter the other channel of the perimeter frame of the adjacent panel. The load distributing connecting members have a tongue to engage the inwardly facing channel of the perimeter frame. The invention also comprises a building having a floor, walls, ceiling, and roof wherein at least the walls are formed of panels according to the invention.

15 Claims, 24 Drawing Figures

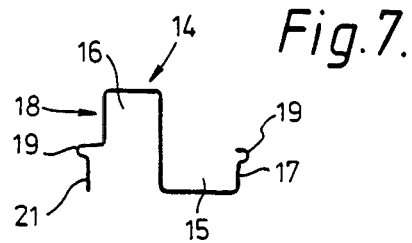
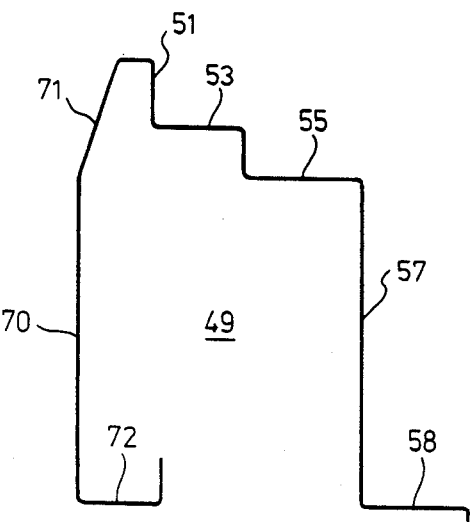
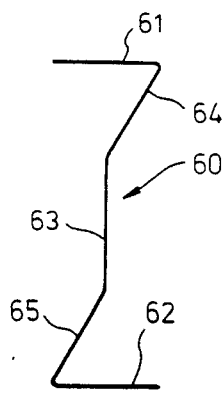
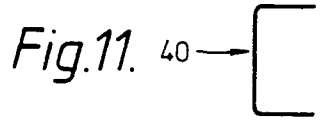

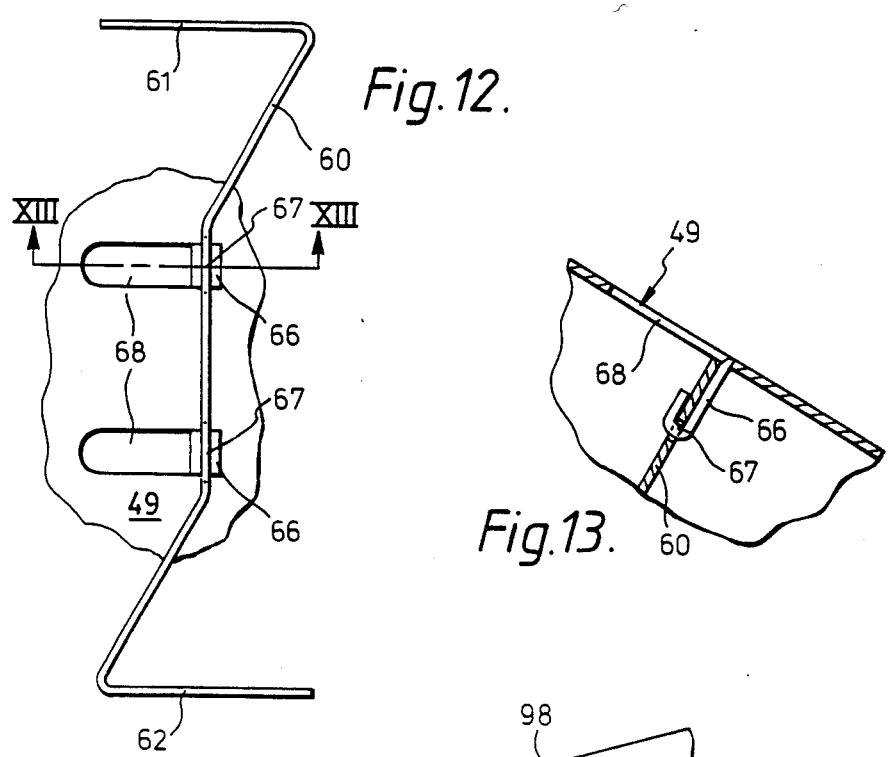
Fig. 12.
Fig. 13.
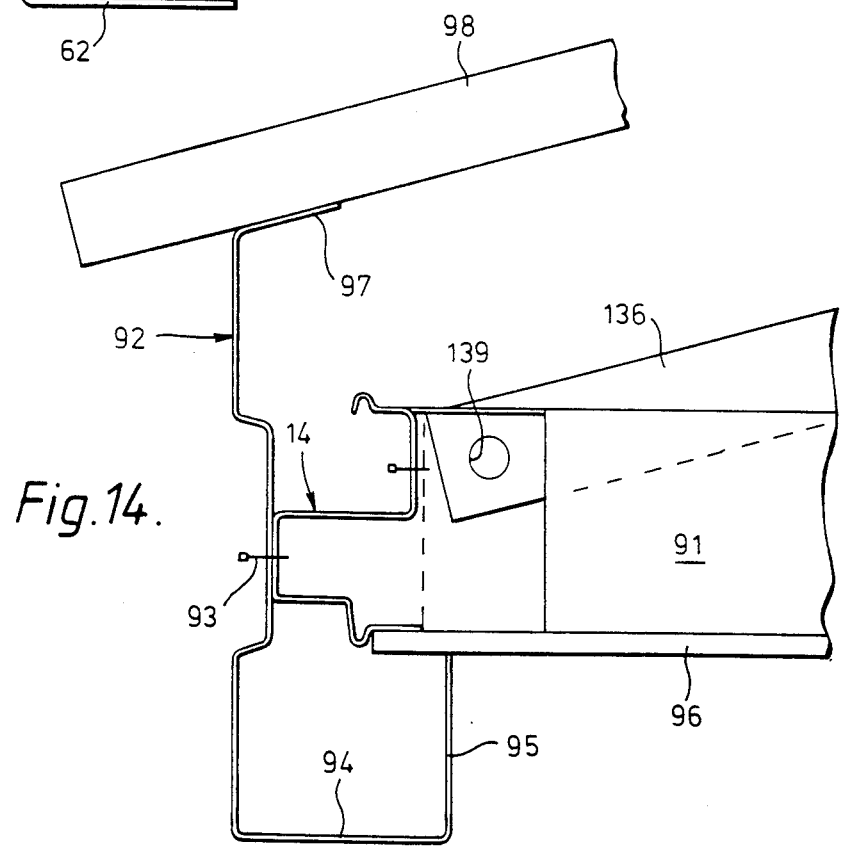
Fig. 14.

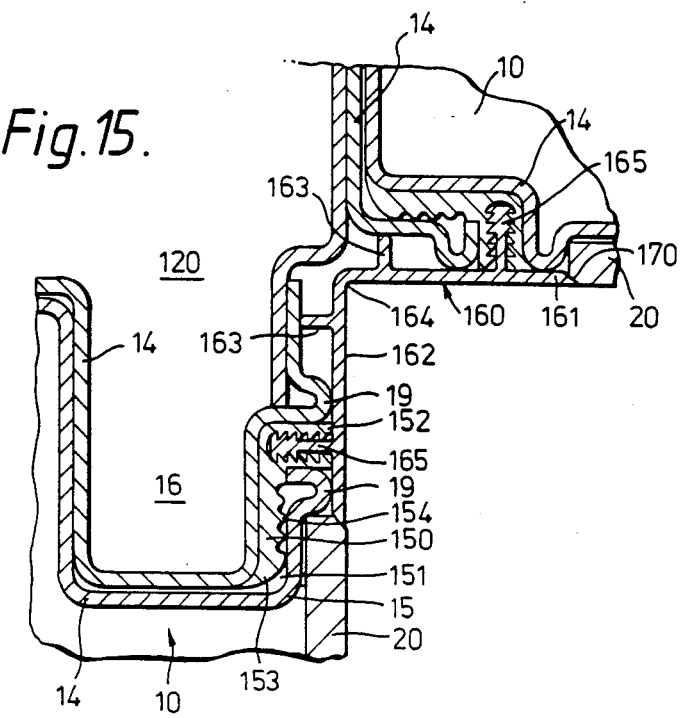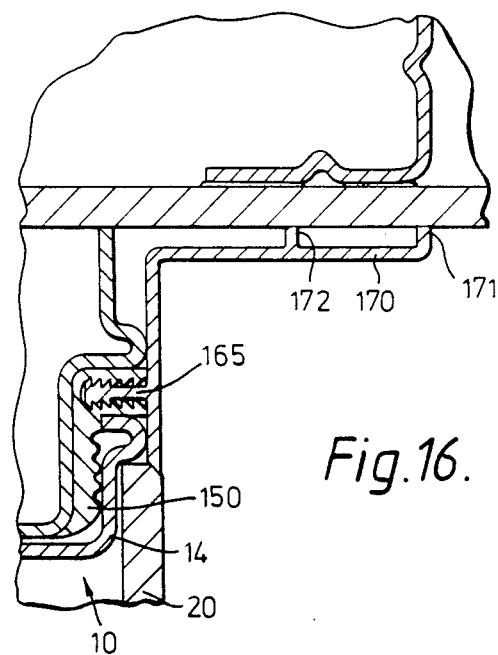

STRUCTURAL CONNECTORS AND/OR STRUCTURES

BACKGROUND OF THE INVENTION

1. Field of the Invention

This invention relates to a panel and/or a building.

2. Description of the Prior Art

Conventional buildings require a substantial trade skill level in order to prepare the structural elements and erect the building. Particularly in areas where the trade skill level required is not available, the construction of buildings is therefore disadvantaged because either persons with the appropriate skill level must be brought in at substantial cost or the building is manufactured and put together in a possibly inadequate way.

This is of course disadvantageous.

BRIEF SUMMARY OF THE INVENTION

It is an object of the present invention to provide a panel and/or a building which will go at least some way towards overcoming the foregoing disadvantages.

Accordingly in one aspect the invention consists in a panel comprising a perimeter frame, a pair of skins spaced apart by said perimeter frame, and load distributing connecting members at the corners of said frame, said perimeter frame being formed from members having two oppositely directed channels so that when a pair of panels are positioned in a side by side relationship one channel of the perimeter frame of one panel will enter the other channel of the perimeter frame of the adjacent panel, the load distributing connecting members having a tongue to engage the inwardly facing channel of the perimeter frame.

In a further aspect the invention consists, in a building having a floor, walls, ceiling, and roof wherein at least some of said walls are formed of panels according to the preceding paragraph.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The invention consists in the foregoing and also envisages constructions of which the following description provides examples.

BRIEF DESCRIPTION OF THE DRAWINGS

One preferred form of the invention will now be described with reference to the accompanying drawings wherein:

FIGS. 7 to 11 are schematic cross-sectional views of various frame and beam members useable in the construction of the invention;

FIG. 12 is an elevational view of a joist to beam fixing arrangement for use in relation to the flooring of the present invention;

FIG. 13 is a cross-sectional view of the fixing construction of FIG. 12;

FIG. 14 is a side elevational view of a fascia construction useable in the building of the invention; and FIGS. 15 to 22 are cross-sectional views of embodiments of joints between various panels showing the positioning of a finishing trim and ceiling member.

DETAILED DESCRIPTION

Figure 1:
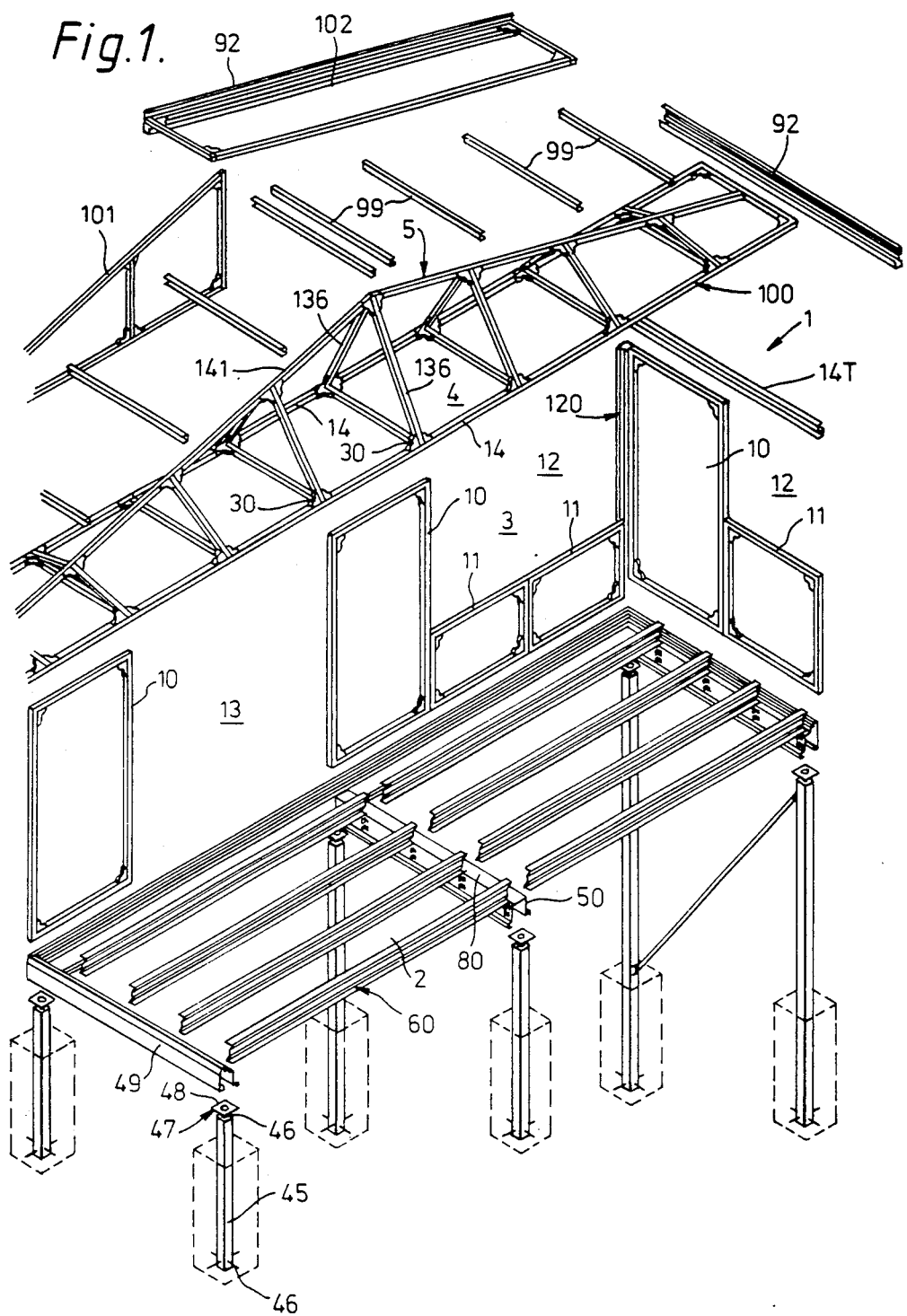
FIG. 1 is an exploded perspective view of the framework of a building according to one preferred form of the invention including panels according to one preferred form of the invention.

One preferred form of the invention will now be described.

In the preferred form of the invention a building 1 is formed of frame members which provide a floor at 2, wall panels at 3, a ceiling at 4 and a roof at 5.

The walls may be formed of panels such as panels 10 and 11 which may be spaced to provide for example window openings at 12 and a door opening at 13.

The panels 10 and 11 are formed from perimeter frame members such as frame member 14 which member has a pair of opposed channels 15 and 16 (FIG. 2A) which in effect provide a tongue and groove like arrangement on each side of the member 14. One outer arm 17 is of lesser extent than the other outer arm 18 and each arm has an outward protrusion 19 formed therein for example by folding of metal where the member 14 is provided of metal or for example formed as part of an extrusion where other materials are used so that the outward protrusion 19 forms a reference point against which panel cladding 20 may be butted to accurately position the cladding 20 as can be seen in FIG. 3. The member 14 is shown in FIG. 7 and as can be seen the channel 15 is wider than the channel 16 so that the channel 16 will enter the channel 15 of an adjacent channel member. The part of arm 18 that extends beyond the outward protrusion 19 at 21 is stepped outwardly so that when a pair of perimeter frame members 14 are engaged one with the other the part 21 will lie substantially in the same plane as the arm 17.

Figure 2C:
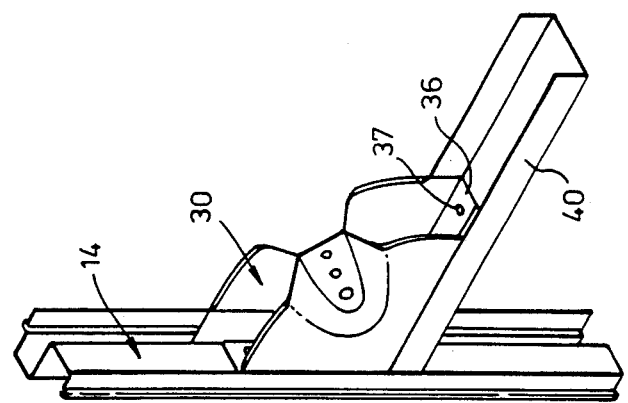
FIGS. 2A, 2B and 2C are perspective views of various embodiments of connections between load distributing connection members and panel perimeter frames according to the invention.
Figure 2B:
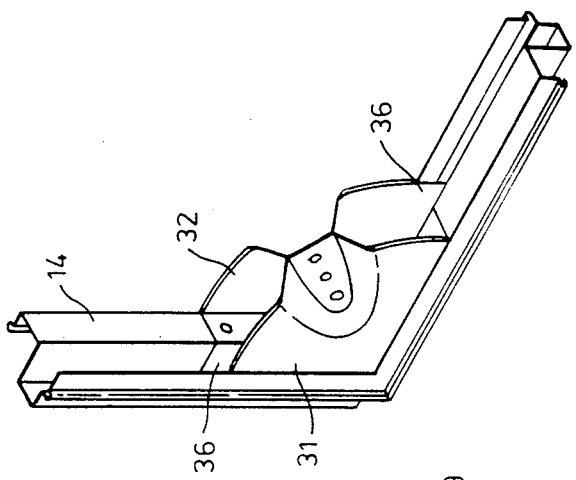
Figure 2A:
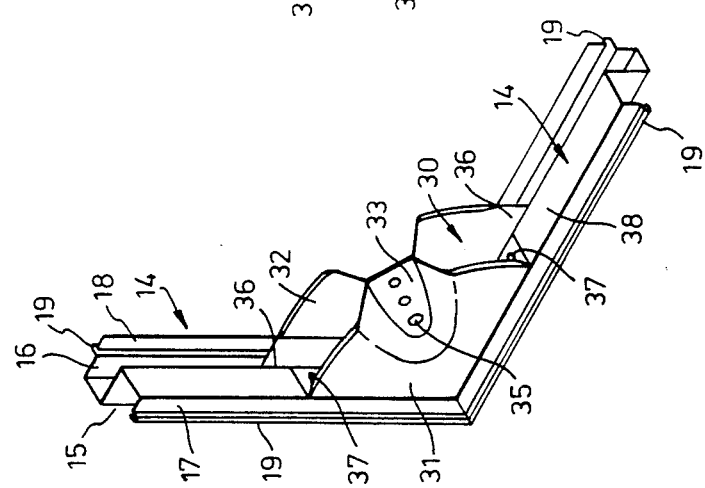
Figure 3:
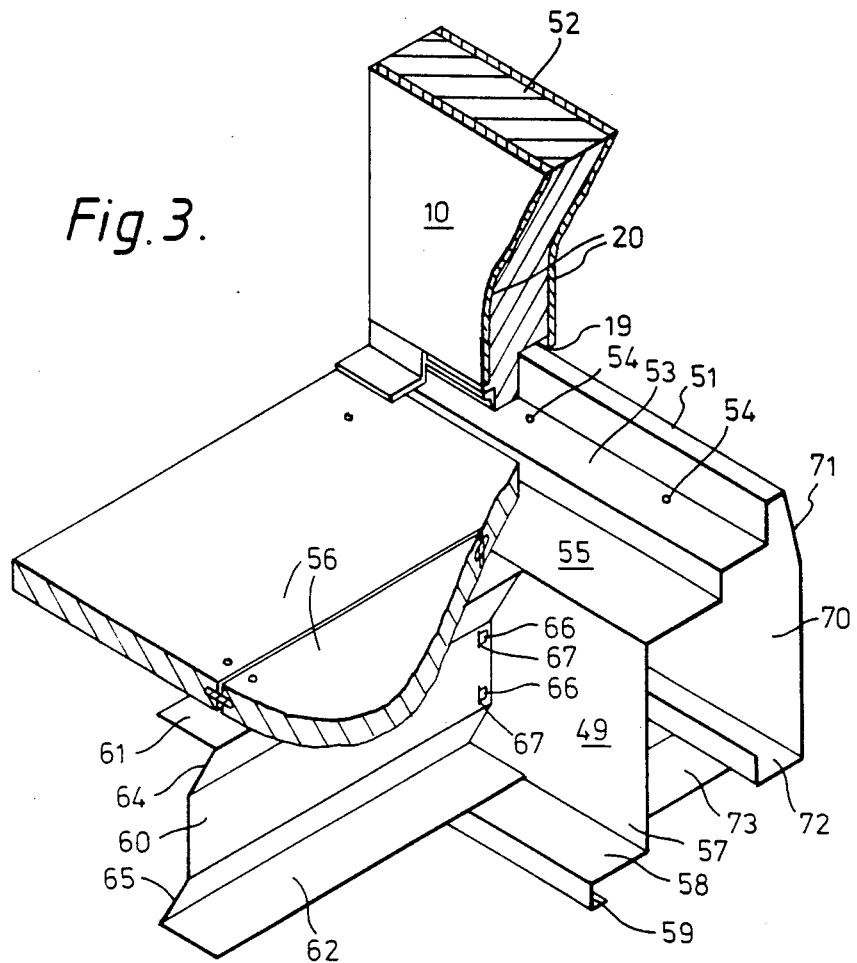
FIG. 3 is a perspective view of a floor construction forming part of a building according to the invention.

FIG. 2A shows a corner joint of an equal nature, FIG. 2B shows a corner joint of an unequal nature and FIG. 2C shows an intermediate joint for a panel. As can be seen in FIG. 2B the vertical perimeter frame member 14 is reversed when compared to the horizontal frame member 14. Each corner is braced by a load distributing connecting member 30 which may be formed from a pressing and comprises a pair of plates 31 and 32 which are swaged inwardly at 33 so as to abut, there being a series of holes therethrough to enable the receipt for example of bolts, rivets or the like. The perimeter of the member 32 is provided with a tongue at 36 which extends inwardly into the groove 16 and a flat at 37 which is able to be placed on the bottom surface 38 of the channel 15. Thus the load distributing connecting members are positioned within the perimeter frame 14. As can be seen in FIG. 2A the tongues 36 are both adjacent the plate 32 whereas in FIG. 2B the tongues 36 are placed one against plate 32 and the other adjacent plate 31. The load distributing connecting members may be fixed to the adjacent frame member 14 for example by bolts, rivets or screws passing through aligned apertures 37 in the load distributing connecting member 30 and the panel 14. In the construction of FIG. 2C a substantially u-shaped channel section 40 is provided into which a load distributing connecting member 30 is positioned shaped so that the tongue at 36 enters the channel 40 and again may be fixed by a screw, bolt or the like through the aperture 37. The construction of FIG. 2C provides a central brace for a large panel. The cross section of a suitable channel member 40 is shown in FIG. 11. This channel member has other uses as will be described further herein.

A floor may be provided substantially as shown in FIGS. 1 and 3. Foundations may be provided by providing leg members 45 which may be provided with cross extensions 46 as shown in FIG. 1 which may be set for example into concrete on site. The length of the leg member 45 is preferably such as to extend below the frost line where relevant. Into the member 45 is positioned a further member 46 and the engagement may be by means of a screw thread. At the upper end of member 46 is a plate 47 which may include holes such as 48 through which may be passed bolts, rivets or screws so that the plate 47 may be engaged with for example perimeter floor frame members 49 or internal frame floor members 50 by rotating the inner member 46 until it comes adjacent the member 49 or 50 and the member 46 can then be fixed to the members 49 or 50 for example by means of screws or bolts through the apertures 48 and suitable parts of the members 49 or 50. A cross section of the member 49 is shown in FIG. 8 and a cross section of the member 50 is shown in FIG. 9. The member 49 takes the form of a modified inverted channel. The upper surface of the member 49 includes an outwardly extending tongue 51 which is able to be positioned in the groove 15 of a frame member 14 supporting a panel 10 or 11. The panels 10 or 11 are comprised of a frame as previously described with cladding panels 20 positioned as described and the cladding panels may be formed of any suitable materials such as aluminium, timber, plastic, steel or the like with a foamed plastics core 52 which will adhere the skins 20 to the perimeter members and also gives good sound and heat insulating properties as well as being substantially load bearing and forming the panel into a stressed skin diaphragm.

The member 49 includes a flat 53 upon which the outer surface of the channel 16 may rest and the surface 53 may have a number of apertures 54 therethrough through which bolts, screws or the like may be inserted to pass through into the panels 10 or 11.

The upper surface is then stepped downwardly to form a further flat 55 onto which may be positioned the edge of flooring members 56 which may be fixed by suitable screws or the like passing through the flooring panels 56 and through the flat 55. An inwardly facing vertical surface 57 is provided which leads to a lower flat 58 which may have a strengthening channel 59 positioned thereon. Joists 60 are provided to provide support for the flooring members 56 and the joists 60 may be formed for example by a member in the form of a modified Z-section for example as shown in FIG. 10 having therefore an upper flat surface 61 and a lower flat surface 62. A substantially vertical surface 63 is provided between the connecting parts 64 and 65. Thus the surface 62 may rest on the flat 58 and the surface 61 may be substantially co-planar with the surface 55. The joist 60 may be engaged with the perimeter beam 49 in any desired manner but may be affixed for example by lanced out tabs 66 from the beam 49 which enter apertures 67 in joist 60 so that the tabs may then be bent over to complete the fixing. Thus for example FIGS. 12 and 13 show the fixing details including aperture 68 from which the tabs 66 have been lanced.

The exterior walls 70 of the perimeter beam 49 initially extend outwardly downwardly in the area 71 so as to form a self flashing construction as any drips on the outer wall will fall from the outward extension 19 of the panel perimeter frame.

The outer wall 70 is turned inwardly at 72 to form a strengthening rib and also to provide a position wherein a cross piece 73 may be fixed which can be utilized for example for fixing the foundation plate 46.

Suitable trim may be positioned as will be described further later herein.

The member 50 has an upper flat surface 80 which will lie co-planar with the edge 61 of the joist 60 and also lower side flats 81 upon which the part 62 of the joist 60 may be positioned. In cross section therefore the member 50 can be considered substantially as a top hat member.

Figure 4:
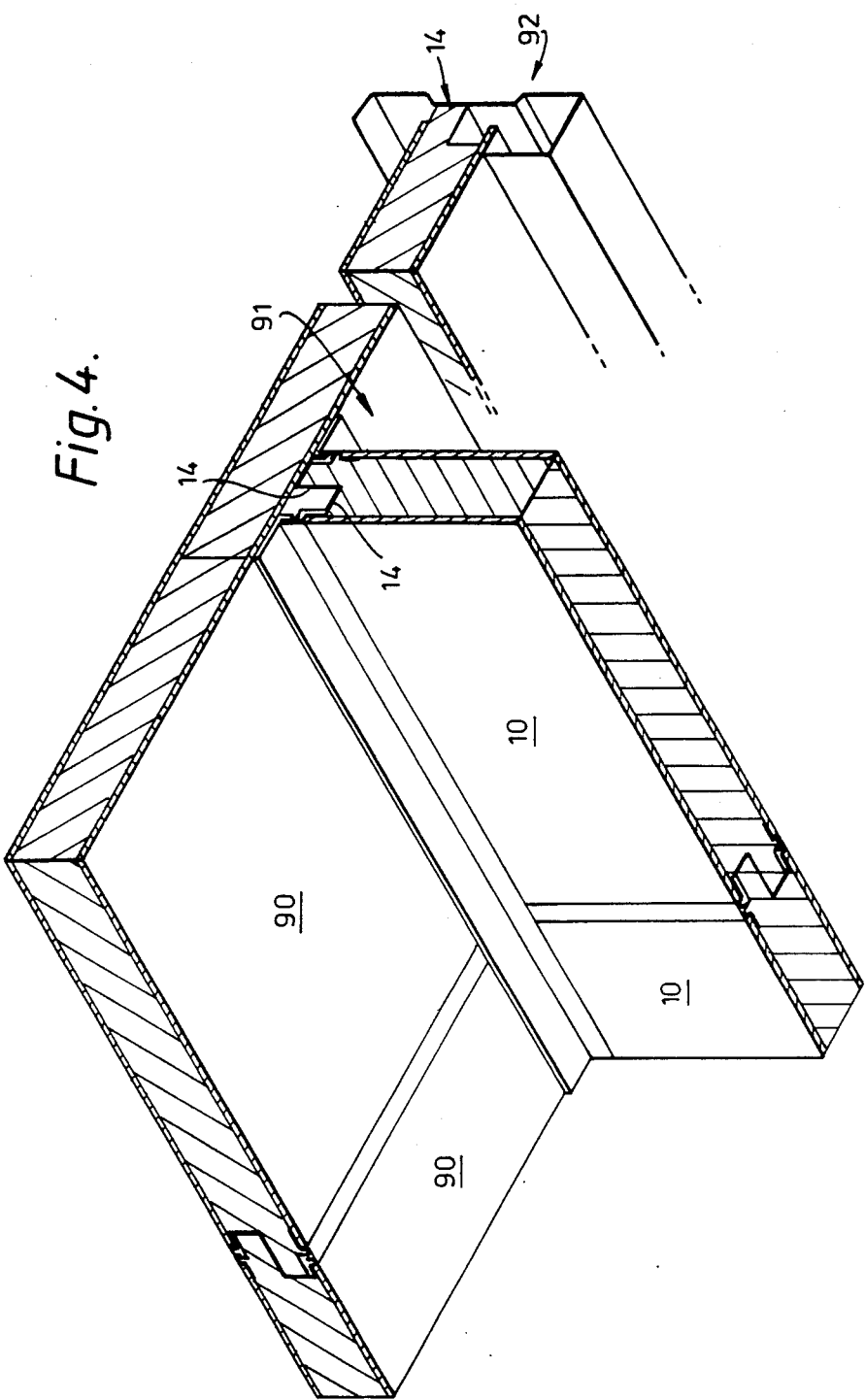
FIG. 4 is a perspective view of a ceiling construction according to one preferred form of the invention.

FIG. 4 shows a ceiling construction in which ceiling panels at 90 are provided formed substantially as described for panels 10 and 11. Panels 10 as shown in FIG. 4 form an exterior wall and a soffit panel 91 extends across the top of the panels 10 the upper edge of the panel 10 being fixed by co-engaging members 14 one of which is affixed to the soffit panel 91.

The member 14 at the external edge of the soffit panel 91 may have a fascia panel 92 (see also FIG. 14) engaged therewith for example by a rivet, screw or bolt at position 93. The fascia panel has a lower channel part 94 the inner arm 95 of which extends upwardly to engage the lower skin 96 of the panel 91.

The fascia has an inclined flange 97 at its top edge which forms a support for roofing material 98 and the roofing panels 98 are also positioned on purlins 99 which are positioned on roof trusses 100 as will be herein further described. The purlins shown in FIG. 1 are shown only between the truss 100 and gable panels 101 but in fact would extend the full width of the building. Below the purlins 99 between the truss 100 and gable panels 101 are positioned barge sheets 102 as will be described further herein.

Again suitable trim is provided as will be described further herein.

The roofing and positioning of purlins 99 allows the positioning of solar water and space heating panels to be positioned in the roof.

Corners between panels 10 and/or 11 as required can be formed from a vertical post 120 having members 14 positioned thereon or being shaped to a similar shape. Such corners can be inserted horizontally after the walls have been erected because of their shape which enables the corner member to be juggled between the adjacent panels.

The floor wall and roofing elements are desirably formed to a grid system so as to enable the factory building of the construction.

The ceiling soffit or roof assembly 100 shown in FIG. 1 includes the panels 90 and 91 of FIG. 4 upon which the fascia member 92 is mounted.

In order to form the roof a construction is provided wherein the struts are pivotally fixed with respect to members 14 forming part of the roof panels.

Figure 5:
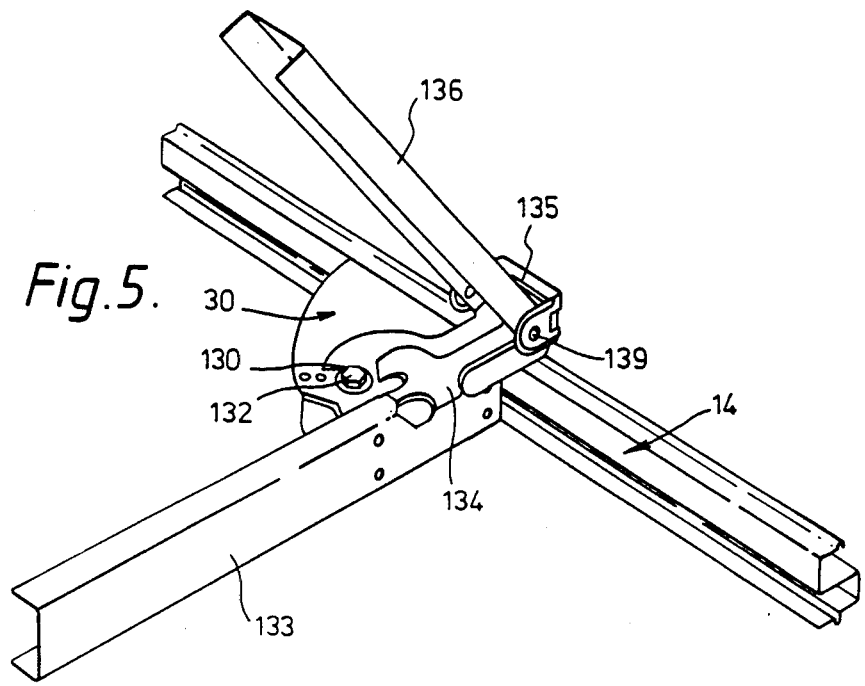
FIG. 5 is a perspective view of a frame construction for the joint forming part of the ceiling and roof of a building according to one preferred form of the invention.
Figure 6:
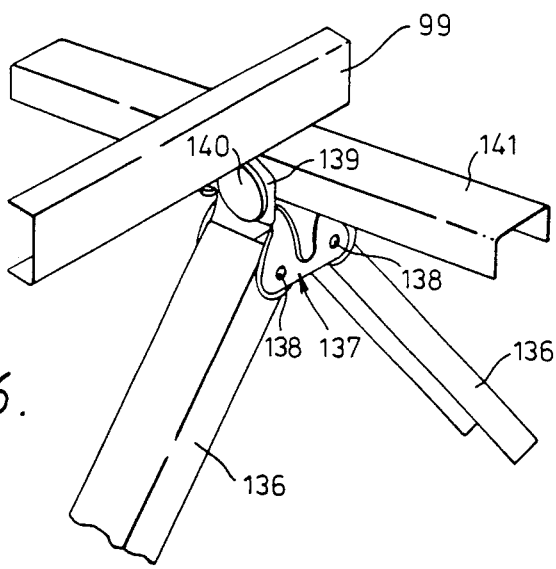
FIG. 6 is a perspective view showing the top end of struts forming part of a roof in the preferred form of the invention.

To this end a bracket is provided which is able to be engaged with the load distributing support member 30 engaged with the member 14 as can be seen in FIG. 5. Thus the bracket has a downwardly depending parts 130 with an aperture therein through which may be passed a bolt 132 which engages the aperture 35 in the connector 30.

Cross members of the ceiling soffit roof assembly 100 such as channel members 133 which may be of the type shown in FIG. 11 support part of the bracket 134 from which the downwardly depending part 130 extends. The bracket includes a channel part 135 with which a strut 136 may be pivotally connected. The strut 136 may also be a channel member of the type shown in FIG. 11. Pairs of opposed struts 136 are brought together at a further connecting bracket 137 and again the struts 136 may be pivotally attached thereto. The brackets 137 therefore include a channel through which the pivot pins 138 which match pivot pins 139 on bracket 134 are passed. The bracket 137 also has an upwardly extending part 139 through which a bolt or other fixing device 140 may pass into an upper roof member 141 across which the purlins 99 are positioned.

The purlins 99 carry the roofing material which is engaged at its ends to the sloped part 97 of the fascia 92 as previously described.

The purlins 99 may be channel members as shown in FIG. 11 and the gable panels and the barge boards may be formed substantially in the manner of the panels 10 and 11 although the barge boards 102 preferably carry the fascia member 92 on the outwardly facing surfaces thereof.

The gable panels can again be formed substantially as for panels 10 and 11 except that the load distributing connection members described can only be fitted into right angles. Alternatively shaped connectors could be provided if desired.

The constructions of FIGS. 15 to 22 will now be described.

In the construction of FIG. 15 a corner post 120 is provided including mounting elements 14. Panels such as panel 10 are engaged therewith by interlocking of further members 14 as herein described. As can be seen there is a space between the channel 16 and the channel 15 within which it is positioned and also the protrusions 19 are spaced apart. This allows a sealing strip 150 to be placed into the gap 151 so created; thus in cross section the sealing strip 150 is substantially "L" shaped having a slot 152 and an outwardly turned tapered end 153 to assist in locating the strip. At least one edge may be formed to serrations 154 to provide load distribution and moisture drainage between the channels 15 and 16. In the construction of FIG. 15 which shows a corner to panel joint a trim member 160 is shown which includes two arms 161 and 162 with spacing feet 163 on each arm but adjacent the corner 164. A pair of fixing ridges 165 are provided which extend into the slot 152 and the fixing arm 165 and slot 152 may be saw toothed to provide a secure engagement. The skins 20 may be champhered at the corners 170 and the trim 160 may be similarly shaped to provide a satisfactory finish.

In the construction of FIG. 16 a side wall to ceiling or soffit joint is shown. The construction is substantially similar except that only one fixing ridge 165 is shown and the free arm of the construction 170 includes an end spacing foot 171 and an intermediate spacing foot 172.

Figure 17:
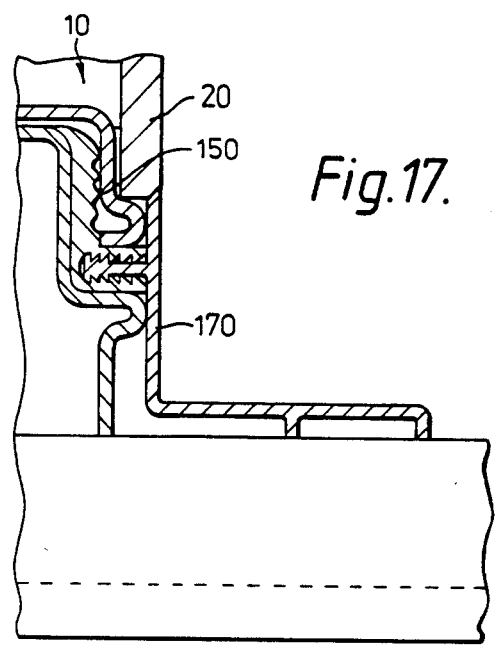
Figure 18:
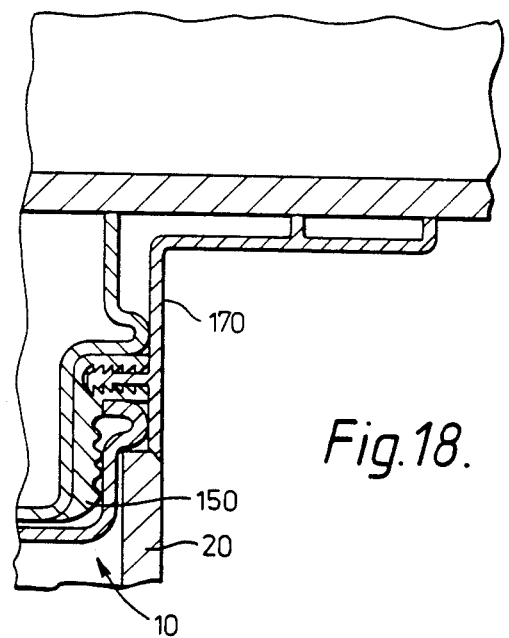

The construction of FIG. 17 shows an interior wall to floor joint and the trim detail again uses the trim element 170. FIG. 18 shows an interior wall to ceiling joint and again the trim strip 170 is shown.

Figure 19:
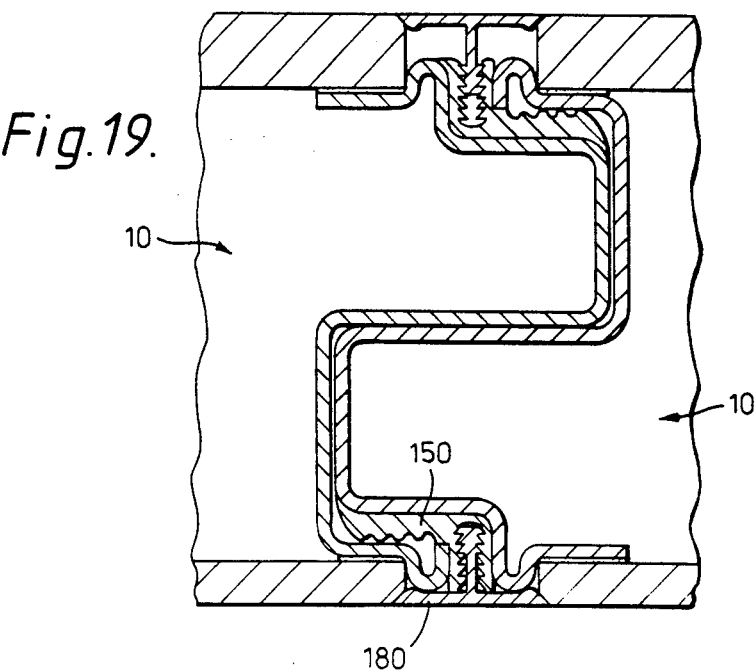

In the construction of FIG. 19 a wall panel joint is shown between, for example, panels 10. The sealing strip 150 is provided but the trim member 180 is substantially "T" shaped so as to fit into the recess provided.

Figure 20:
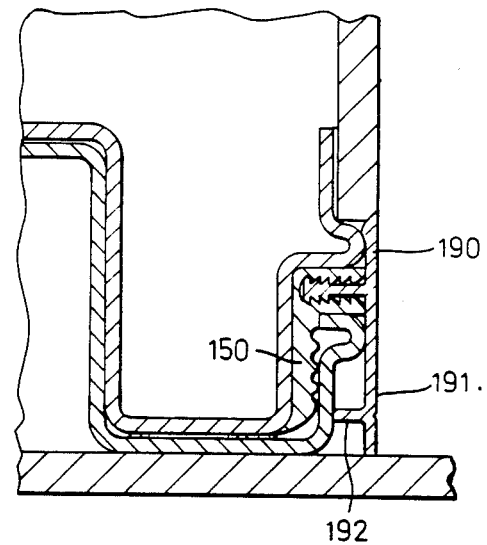

In the construction of FIG. 20 which shows an interior wall to interior or exterior wall connection the trim strip 190 is again substantially "T" shaped although one arm 191 has been extended and providing with a positioning foot 192. The trim member 160 (FIG. 15) can be formed from two trim members 190.

Figure 21:
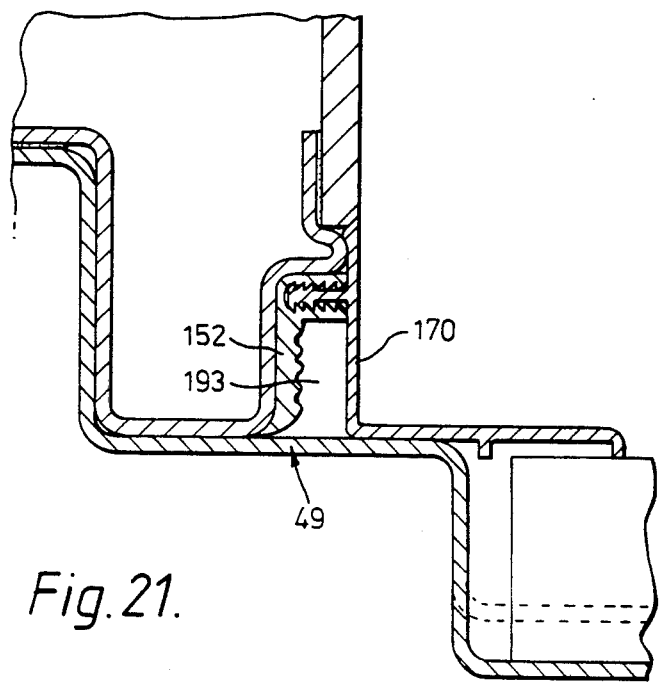

FIG. 21 shows an exterior wall panel to floor joint and a trim strip 170 is again used except that the ceiling member 152 is positioned into a recess 193.

Figure 22:
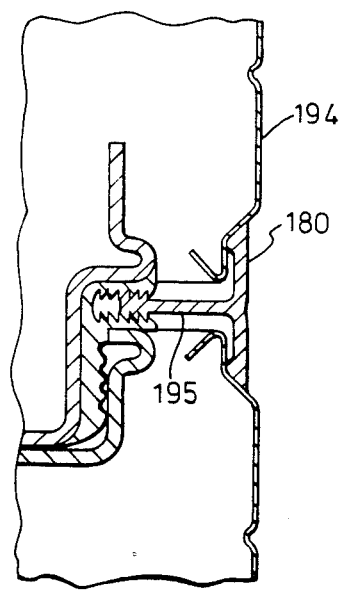

FIG. 22 shows an exterior wall panel joint which is constructed with the trim strip 180 which is positioned in the construction shown into a recess provided by shaping metal cladding 194. It will be noted that in this construction the thickness of the wall panel has been increased and the stem 195 of the trim 180 has been extended.

Thus dealing with the various components the floor components provide a height adjustable foundation pier which can be adjusted for example up to the full storey height. A self flashing load distribution perimeter beam is provided along with a center beam and the particular joist shape shown, that is to say member 60 interlocks for transport or storage. Locking tabs are provided between the joists and the perimeter and central beams. The wall components are interlocking on all edges with an integral flush finished jointing system which combines flashing, draining and sealing functions. A structural stressed skin construction is provided with a foamed core. The panel edges are tensioned between gussets and fixing points to provide cyclone and earthquake resistance and also allow integral services of electrical plumbing, gas, security and telephone.

The ceiling soffit comprises a structural diaphragm acting at the lower tension member for a roof space frame in load conditions and a compression member in uplift conditions. Interlocking is provided on all edges with integral flush finished jointer system. The structural stress skin construction with a foam core again gives good sound and heat insulating properties and also allows integral eletrical services.

The roof construction allows the space frame to fold down flat in sections particularly for transport by removal of the purlins 99 and the panel 91. The angle of the struts 136 is adjustable to allow any desired roof pitch for example from 150 upwards which is adjustable to suit cyclone, earthquake and snow load conditions. The fixing throughout enables the space frame to evenly distribute loads through the walls and floor to the foundations thereby avoiding point loads and also acts as a lintel to openings. The space frame brackets are self-centering for assembly and transport folding and self centering for erection. The fascia member acts as a bottom purlin, a structural space frame edge member and also can provide the exterior finish to the roof. The space frame can cantilever over open porches and verandas without the need for vertical supports in addition to the walls. The purlins, which may be formed for example of metal, form part of the space frame.

Door and window frames are able to be provided which clip into position by engagement into the appropriate channel 15 or 16. As the wall panels are directly bolted to the perimeter beams and the wall panels are also directly bolted to the ceiling construction through the top plate labelled 14T in FIG. 1 so that bolts or other similar fixing elements pass through the ceiling panels into the top walls, the ceiling walls and flooring are securely bolted one to the other. By virtue of the bolts 132 the roof space frame is also directly connected to this construction in a secure manner therefore enabling secure load distribution over the construction.

Thus it can be seen that during construction of the building it is not necessary to provide internal walls although these can be provided in other manners for example by the use of curtains or screens or the like.

It can also be seen that at least in the preferred form of the invention a panel and/or a building are provided which has the advantage that a building is provided which incorporates factory produced componentry based on a space frame, diaphragm and stress skin concept not requiring internal support or bracing walls, while able to resist earthquake, cyclonic winds and snow loads. The system is able to be based on a three dimensional grid but the internal layout of the walls can be off the horizontal grid. Because of the particular edge engagement system provided all components are self-centering. Also the building is able to be erected on site by workers having a low trade skill level thereby obviating the need for the importation of skilled labor if unavailable. The building also arrives on site from the factory substantially complete including all parts of the foundations except the concrete into which the foundations are to be set. Because of the arrival in this form on site work is considerably reduced.

We claim:

1. A panel comprising:
   a perimeter frame comprising members having a first inwardly facing channel and an oppositely outwardly facing second channel so that when a pair of panels are positioned in a side-by-side relationship, one of said channels of the perimeter fame of one panel is engageable in the other channel of the perimeter frame of the adjacent panel;
   a pair of skins spaced apart by said perimeter frame; and
   load distributing connecting members at the corners of said perimeter frame;
   each load distributing connecting member comprising a pair of spaced plates joined over a part of the surface of each plate, and at least one of said plates having a tongue member engageable with each adjacent inwardly facing channel.

2. A panel as claimed in claim 1 wherein the space between said frame and said skins is filled with a core material to form a stressed skin panel.

3. A panel as claimed in claim 1 wherein said channels of said perimeter frame provide a pair of side arms and outward extensions on each side arm, said extensions providing a reference to position said skins.

4. A panel as claimed in claim 1 wherein said plates comprise inwardly swaged portions which abut over a part of the area of each plate.

5. A building having a floor, walls, ceiling, and roof wherein at least said walls are formed of panels as claimed in claim 1.

6. A building as claimed in claim 5 wherein said floor comprises a perimeter beam having a tongue engageable in said second channel of the perimeter frame of said wall panels.

7. A building as claimed in claim 6 wherein joists are provided between opposite parts of said perimeter beam.

8. A building as claimed in claim 7 wherein said perimeter beam has a surface provided in substantially the same plane as the tops of said joists so that said surface and said joists together support said floor.

9. A building as claimed in claim 5 wherein said ceiling is formed of said panels in substantially the same manner as said wall panels.

10. A building as claimed in claim 9 wherein at least some load distributing connecting members in said ceiling panels carry brackets struts being pivotally mounted on said brackets.

11. A building as claimed in claim 5 wherein a perimeter frame is mounted on the underside of said ceiling for engagement with the perimeter frame at the top of said wall panels.

12. A building as claimed in claim 5 wherein said ceiling is formed of ceiling panels and overlaps the exterior wall of said building, a fascia member is mounted about the edge of said ceiling panels, said fascia member having an inclined upper edge, said roofing material is provided having edges positioned on said inclined upper edge.

13. A building as claimed in claim 5 wherein said perimeter frames of said panels have a gap therebetween when in engagement, a sealing member is positioned in said gap and said sealing member has a slot able to be engaged by the stem of a trim member.

14. A building having a floor, walls, ceiling, and roof wherein at least the walls and ceiling are formed of panels comprising:
   a perimeter frame comprising members having an inwardly facing channel and an oppositely outwardly facing channel so that when a pair of panels are positioned in a side-by-side relationship, one of said chambers of the perimeter frame of one panel will enter the other channel of the perimeter frame of the adjacent panel;
   a pair of skins spaced apart by said perimeter frame;
   load distributing connecting members at the corners of said perimeter frame;
   a tongue on each load distributing connecting member engageable with each adjacent inwardly facing channel;
   brackets on at least some of said load distributing connecting members on the panels of the ceiling;
   struts pivotally mounted at one end thereof on said brackets;
   further brackets each having pivotally connected thereto the other ends of a pair of said struts; and
   a connecting member between said further brackets and being connected thereto forming a space frame in conjunction with said struts and the panels of said ceiling.

15. A building as claimed in claim 14 wherein:
   a gap is provided between said engageable channels of said perimeter frames when engaged;
   a sealing member is provided in said gap;
   a slot is provided in said sealing member;
   a trim member is provided extending over said slot; and
   a stem is provided on said trim member engageable in said slot.

* * * * *